(12) United States Patent
Zhou et al.

(10) Patent No.: US 7,010,624 B1
(45) Date of Patent: Mar. 7, 2006

(54) SYSTEM AND METHOD OF SOFTWARE/FIRMWARE UPLOADING AND UPGRADING FOR PERIPHERAL DEVICES

(75) Inventors: Jianyun James Zhou, Singapore (SG); Samuel C.M. Chih, Mountain View, CA (US)

(73) Assignee: Adaptec, Inc., Milpitas, CA (US)

( * ) Notice: Subject to any disclaimer, the term of this patent is extended or adjusted under 35 U.S.C. 154(b) by 414 days.

(21) Appl. No.: 10/114,169

(22) Filed: Apr. 1, 2002

(51) Int. Cl.
*G06F 3/12* (2006.01)

(52) U.S. Cl. .............................. 710/8; 710/15; 710/62; 713/2

(58) Field of Classification Search .................... 710/8, 710/10, 15, 17, 19, 62; 713/1, 2
See application file for complete search history.

(56) References Cited

U.S. PATENT DOCUMENTS

| | | | | |
|---|---|---|---|---|
| 5,581,766 A | * | 12/1996 | Spurlock | 713/2 |
| 5,787,246 A | * | 7/1998 | Lichtman et al. | 709/220 |
| 6,473,854 B1 | * | 10/2002 | Fleming, III | 713/1 |
| 6,581,157 B1 | * | 6/2003 | Chiles et al. | 713/1 |
| 6,607,314 B1 | * | 8/2003 | McCannon et al. | 400/62 |

* cited by examiner

*Primary Examiner*—Kim Huynh
(74) *Attorney, Agent, or Firm*—Martine Penilla and Gencarella LLP (57) ABSTRACT

A system, method and apparatus of connecting a device to a host computer are provided. A host computer detects a connection of a device. The host computer loads a default driver. The default driver establishes a default communication link between the device and the host computer. The host computer identifies the device and loads a device-specific driver. The device-specific driver is stored in a device memory.

10 Claims, 9 Drawing Sheets

SYSTEM AND METHOD OF SOFTWARE/FIRMWARE UPLOADING AND UPGRADING FOR PERIPHERAL DEVICES

BACKGROUND OF THE INVENTION

1. Field of the Invention

The present invention relates generally to systems and methods of delivering and updating software, and more particularly, to systems and methods for delivering and updating device drivers.

2. Description of the Related Art

Typically, when a new computer peripheral device is purchased, the user must also receive a device-specific driver of some sort. The device-specific driver provides a device-specific communication link between a host computer and the peripheral device. The device-specific communication link allows the host computer to fully utilize all available aspects and functions of the peripheral device. For example, a user must also install a compatible device driver for a USB interface device, such as an external drive for a personal computer (PC). The external drive typically requires a specific driver for the PC to communicate with the drive. A typical delivery method is that the driver software will be delivered through the Internet or through a CD that is enclosed in the packaging materials with the device.

Figure 1:
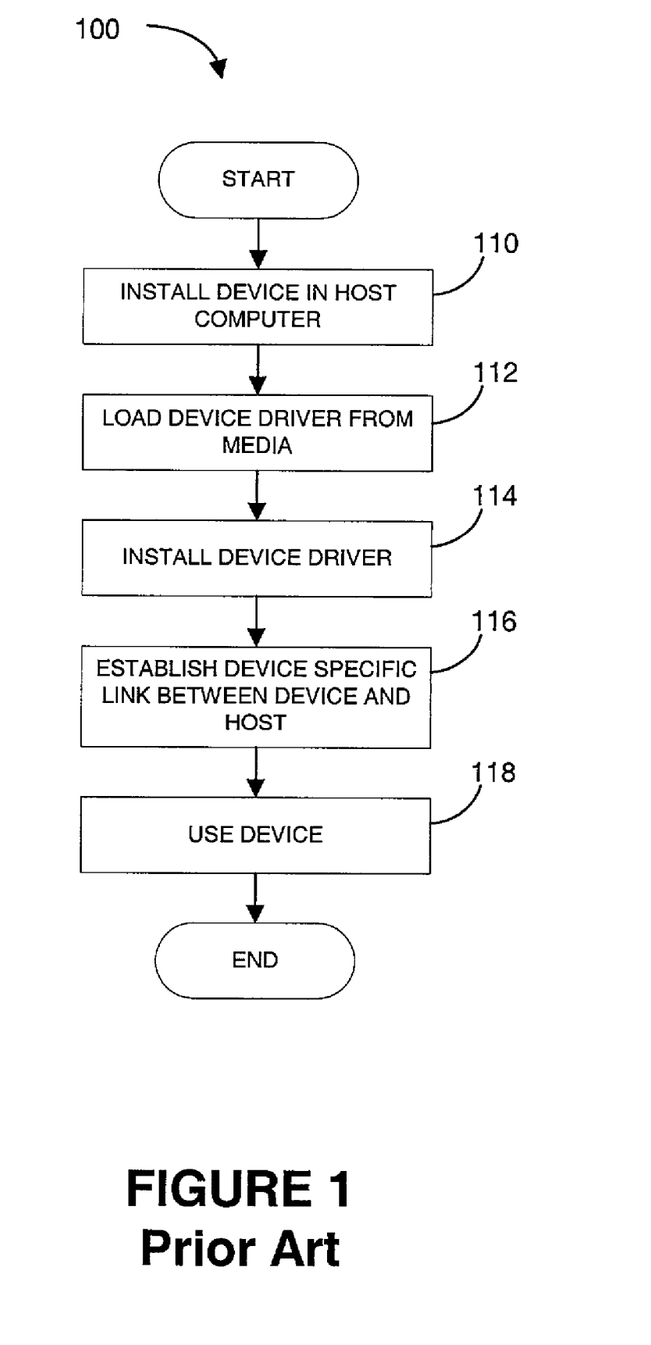
FIG. 1 illustrates a prior art process of delivering a device driver.

FIG. 1 illustrates a prior art process of delivering a device-specific driver. A device is installed or connected to the host PC, in block 110. A compatible device-specific driver must be loaded from some sort of media (i.e., a Compact Disk (CD-ROM) or floppy disk, etc.) or downloaded from the Internet. The media may also be enclosed with the device, from the manufacturer. The device-specific driver is installed in block 114. Once the device-specific driver is installed, then a device-specific communication link can be established between the device and the host PC using the device-specific driver in block 116. The device-specific communication link allows the user to use the device because the PC can efficiently communicate with the device.

Unfortunately, there are many problems with the device-specific driver delivery process described in FIG. 1. First, the user is required to manually install the driver. Often, the user must take additional steps to obtain the driver, such as go to the Internet and download the driver or find the CD-ROM that was shipped with the device. Occasionally the CD-ROM or other media can experience a media failure or other damage that prevents the PC from being able to access the driver that is stored on the media. In addition distribution problems can also occur such as the wrong CD-ROM or the wrong drivers being delivered with the device. Devices are often compatible with multiple PC operating systems (OS) and each OS requires a different device driver. The multiple device drivers further complicate the distribution of the device-specific driver for the user's specific OS.

Still another problem is the portability of the device. Many devices are portable and can be used in multiple locations. For example, a portable device such as a digital camera may be used at the office (i.e., connected to the user's office PC) and used at home (i.e., connected to the user's home PC). Therefore, the process of installing the driver is further complicated because the driver installation must to be duplicated for each and every PC that will be used with the device.

Device-specific drivers are often updated whether to correct defects or to expand capabilities of the device. Under the process described in FIG. 1, whenever a device driver is updated, the updated driver must be obtained and installed for each PC that will be used with the device. This results in the prior art process being even less user-friendly.

In view of the foregoing, there is a need for a more efficient and more user-friendly system and method to deliver, install and update a device-specific driver.

SUMMARY OF THE INVENTION

Broadly speaking, the present invention fills these needs by providing a system, method and apparatus of delivering a device-specific driver to a host computer. It should be appreciated that the present invention can be implemented in numerous ways, including as a process, an apparatus, a system, computer readable media, or a device. Several inventive embodiments of the present invention are described below.

A system, method and apparatus of connecting a device to a host computer are provided. A host computer detects a connection of a device. The host computer loads a default driver. The default driver establishes a default communication link between the device and the host computer. The host computer identifies the device and loads a device-specific driver. The device-specific driver is stored in a device memory.

In another embodiment, a peripheral device includes a memory system and an interface. The memory system includes a device-specific driver that can be accessed by a host-computer, which is coupled to the peripheral device via the interface.

In at least one embodiment, one advantage is that a device-specific driver can be automatically installed in a host computer system when the device is connected to the host computer system. The user is not required to provide the device-specific driver because the device-specific driver is stored in a memory location, within the peripheral device. The host computer can access the stored device-specific driver via a default driver.

Another advantage is that device-specific driver updates and updates of other software and data stored in the device memory system can be automatically installed.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Described below are various embodiments of methods and systems for delivering, installing and updating device drivers and firmware for a peripheral device of a computer. It will be obvious, however, to one skilled in the art, that the present invention may be practiced without some or all of these specific details. In other instances, well known process operations have not been described in detail in order not to unnecessarily obscure the present invention.

At least one goal for a peripheral device of a computer is to make the device as user-friendly as possible. One aspect of making the device more user-friendly is to make the device easier for a user to use and install. Many devices utilize the various plug-and-play types of interfaces that provide for easier installation such as a universal serial bus (USB), Firewire, PCMCIA, and other similar plug-and-play type buses. These and other external-access interfaces further allow a device to be portable and used with multiple computers. In addition, peripheral devices that are installed inside the computer must also be more user-friendly to install so a user can more easily customize the computer to the user's specific needs and desires. As described above, the device-specific driver must also be installed for each computer the device is to be used with.

An external drive connected, via a Universal Serial Bus (USB) port, is used below as an example to describe various embodiments of the present invention. It should be understood that the same principles could also be applied to any other type of interface other than USB. The principles described below are also generally independent of any one particular computer OS and the type of device.

A user obtains a new, external, USB drive. The user desires to install the USB drive in his computer, so that his computer can access the USB drive. Installing the USB drive also includes installing a device-specific driver. The device-specific driver is typically delivered via a CD-ROM or other type of media, and the user must install the driver in the user's computer. As described in FIG. 1 above, installing the driver requires several manual steps on the user's part. In one embodiment, a portion of the operations of installing the device-specific driver is automated. However, to automate these operations requires that a device-specific driver be available, automatically, to the computer so that an automated process can access and install the device-specific driver. In one embodiment, the device-specific driver is included in the device (i.e., such as stored in a memory of the device).

One embodiment utilizes a default driver. One default driver is capable of communicating with a family or other large group of products. For example, one default driver may be compatible with all products from a specific manufacturer. Alternatively, one default driver may be compatible for all USB products, or other groups of devices. The default driver provides a limited communication link between a peripheral device and the computer. The default driver may not provide access to all device-specific functions that a device-specific driver could provide. However, the default driver is installed in the user's computer before the peripheral device is connected to the computer.

The default driver can be delivered through many methods known in the art. For example, the default driver can be delivered with or as part of the computer operating system (OS). The default driver can be delivered with or part of the OS because the default driver is compatible with a large family of products. Alternatively, the default driver could be delivered or downloaded as part of or independent of any particular peripheral device installation.

The default driver allows the computer to establish an initial, default communication link with the USB drive. The computer uses the default communication link to specifically identify the USB drive. Once the USB drive is specifically identified, then the computer must determine if the USB drive requires a device-specific driver. The computer must also determine whether the device-specific driver is already installed in the computer. If the device-specific driver has been previously installed in the computer, then the computer can establish a device-specific communication-link with the USB drive using the device-specific driver. In another embodiment, the device-specific driver is stored in the memory system of the USB drive. If the device-specific driver has not been previously installed in the computer, then the computer can download the device-specific driver from the memory system of the USB drive and then install the device-specific driver.

The disclosed method provides many advantages over the prior art. First, the driver installation process is automatic in that the user is not required to find or install the device-specific driver so that the device can function. In addition, as will be shown in more detail below, the method provides for easy driver and firmware updates and migration of any such updates.

Figure 2A:
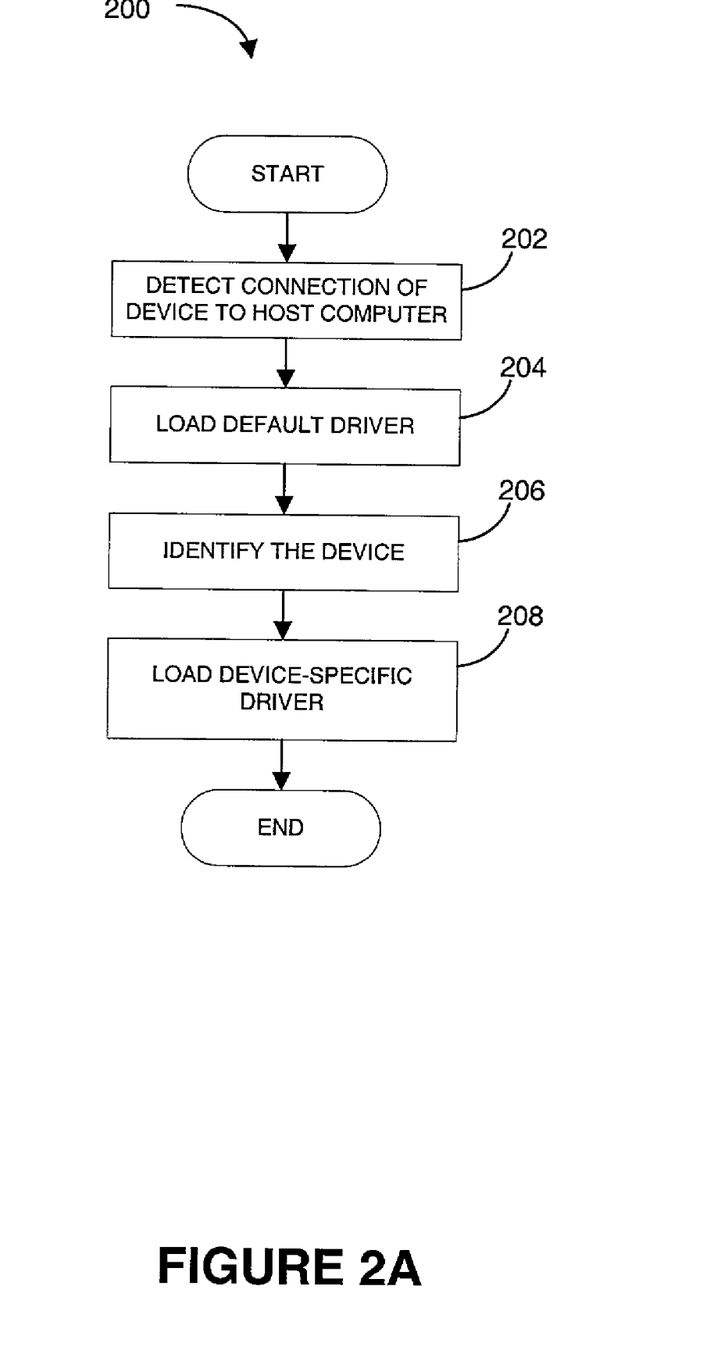
FIG. 2A shows one embodiment of a method of establishing a connection between a device and a host computer.

FIG. 2A shows one embodiment of a method of establishing a connection between a device and a host computer. In block 202, a host computer detects a connection of a device. The host computer loads a default driver in block 204. The default driver establishes a default communication link between the device and the host computer. In block 206, the host computer identifies the device and loads a device-specific driver in block 208.

Figure 2B:
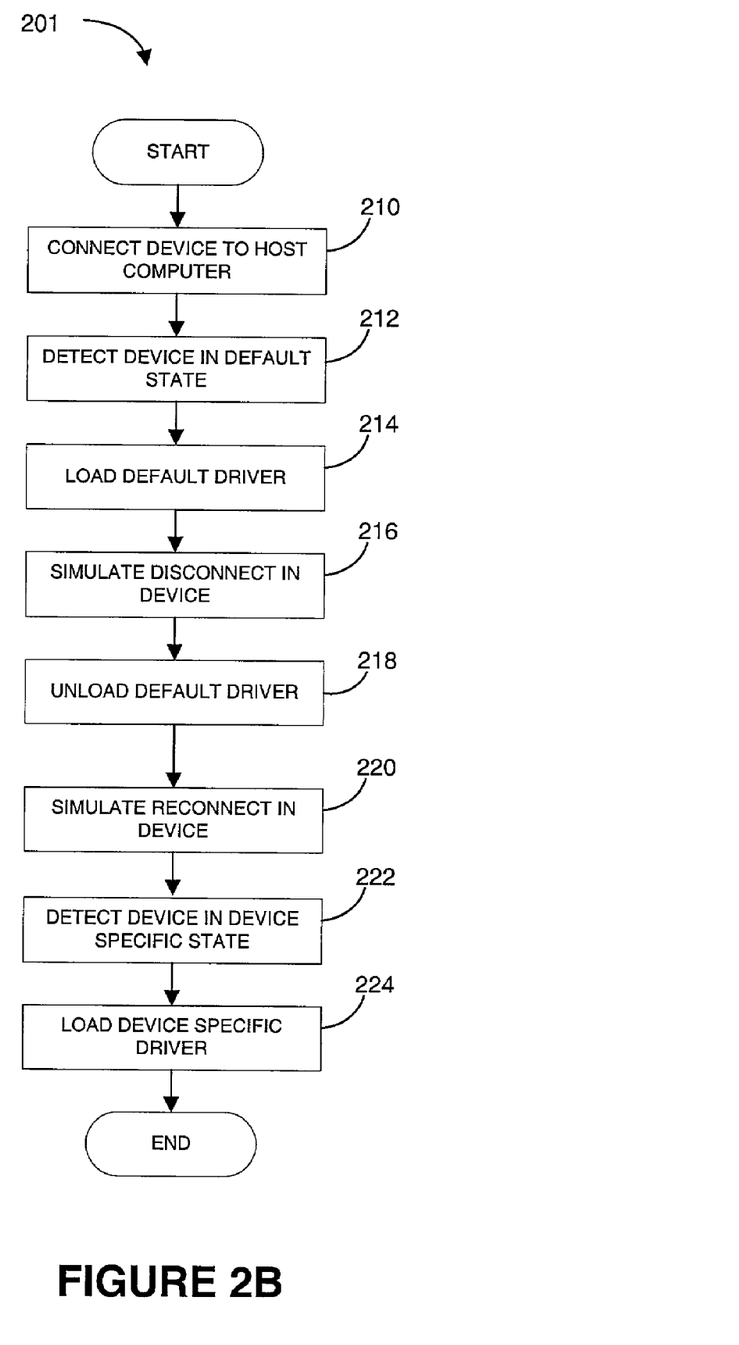
FIG. 2B shows another method of establishing a connection between a device and a host computer.

FIG. 2B shows another method of establishing a connection between a device and a host computer. In block 210, the device is connected to the host computer. In block 212, the host computer detects the device. When the device is connected, the device is in a default state. In one embodiment, in a default state, the device returns a default-device code that is common to all devices that the default driver is compatible with (e.g., all USB devices or all Adaptec devices or other groups of devices). The default-device code corresponds to the default driver as any other device might return a code that identifies a corresponding driver. The host computer loads the default driver in block 214. In block 216, the device simulates a disconnect. In response to the simulated disconnect, the host computer unloads the default driver, in block 218. In block 220, a reconnect is simulated in the device, which causes the computer to detect the device in block 222. When the device initiates the reconnect, the device also switches to a device-specific state such that when the device is detected in block 222, the device returns a device-specific code. The host computer uses the device-specific code to identify a corresponding device-specific driver. The host computer loads the device-specific driver in block 224. The device-specific driver allows the device to communicate with the host computer through the device-specific communication link, and enables all the available functions of the device. In one embodiment, the process described in FIG. 2B above is followed whenever power is applied to the device.

Figure 3A:
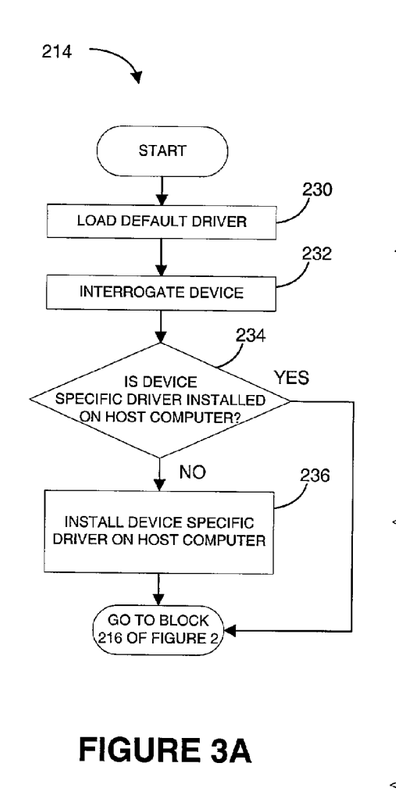
FIG. 3A illustrates one embodiment of loading the default driver.

FIG. 3A illustrates one embodiment of loading the default driver such as in block 204, of FIG. 2A and block 214, of FIG. 2B. In block 230, the default driver is loaded in the host computer and a default communication link is established between the host computer and the device. In block 232, the host computer interrogates the device to specifically identify the device. In block 234, the host computer uses the device identity to identify the corresponding device-specific driver. The host computer determines if the device-specific driver has previously been installed on the host computer. If the device-specific driver has previously been installed on the host computer, then the process continues at block 216 of FIG. 2B. If the device-specific driver has not previously been installed on the host computer, then in block 236, the device-specific driver is installed in the host computer.

In one embodiment, the device-specific driver was previously stored or came pre-stored from the manufacturer in the memory system of the device. The device memory system can include any type of memory device such as flash memory and EEPROM, EPROM, and ROM, or any other suitable type of non-volatile computer readable memory.

Figure 3B:
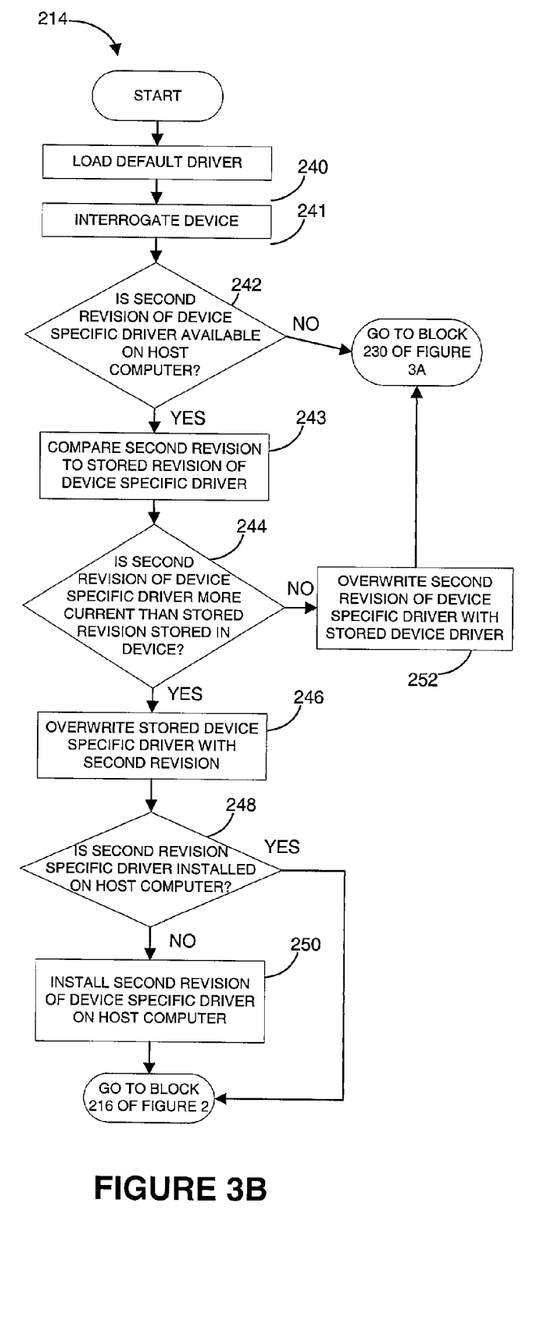
FIG. 3B illustrates one embodiment of a process for a device-specific driver update to migrate when the default driver is loaded.

FIG. 3B illustrates one embodiment of a process for a device-specific driver update to migrate when the default driver is loaded, such as in block 204 of FIG. 2A and block 214 of FIG. 2B. The process described in FIG. 3B illustrates one advantage of the flexibility and user-friendliness of one embodiment. If two revisions of the device-specific driver are available to the host computer then the two revisions can be compared. Both the device and the host computer, as applicable, can then be updated to whichever of the two revisions is the latest revision of the device-specific driver. For example, a first revision of the device-specific driver is stored in the memory system of the device and a second revision of the device-specific driver was previously installed or stored on the host computer. The first and second revisions are compared. If the second revision of the device-specific driver is the latest update of the device-specific driver, then the first revision is automatically overwritten by the second revision. Alternatively, if the first revision is the latest revision, then the first revision is automatically installed in the host computer and the second revision is uninstalled or otherwise overwritten or deleted.

Automatic migration of the updated device-specific driver allows the latest device-specific driver to migrate from a first host computer (i.e. the user's office computer) to the device and later to a second host computer (i.e., the user's home computer). Automatic update migration further simplifies installation and updates of the driver and therefore makes the device much easier to use.

In block 240 of FIG. 3B, the default driver is loaded in the host computer and a default communication link is established between the host computer and the device. In block 241, the host computer interrogates the device to specifically identify the device. In block 242, the host computer is interrogated to determine if a second revision of the device driver is available on the host computer. If a second revision of the device driver is not available on the host computer, then the process continues at block 234 of FIG. 3A, as described above. If a second revision of the device-specific driver is available on the host computer, then the process continues in block 243. In block 243, the second revision is compared to the stored revision of the device-specific driver that is stored in the memory system of the device.

In block 244, if the second revision of the device-specific driver is not more current than the revision stored in the device, then the process continues in block 252. The second revision of the device-specific driver is overwritten with the stored revision device-specific driver that is stored in the device's memory system in block 252. The process then continues in block 230 of FIG. 3A. Returning to block 244, if the second revision of the device-driver is more current than the stored revision, then the process continues in block 246. The stored device-specific driver is then overwritten by the second revision of the device-specific driver in block 246. The host computer is analyzed to determine if the second revision of the device-specific driver has been installed on the host computer in block 248. If the second revision of the device-specific driver has not been installed on the host computer, then in block 250, the second revision of the device-specific driver is installed in the host computer. The process then continues at block 216 of FIG. 2B described above. Returning to block 248, if the second revision of the specific driver has previously been installed on the host computer, then the process continues at block 216 of FIG. 2B.

Figure 4:
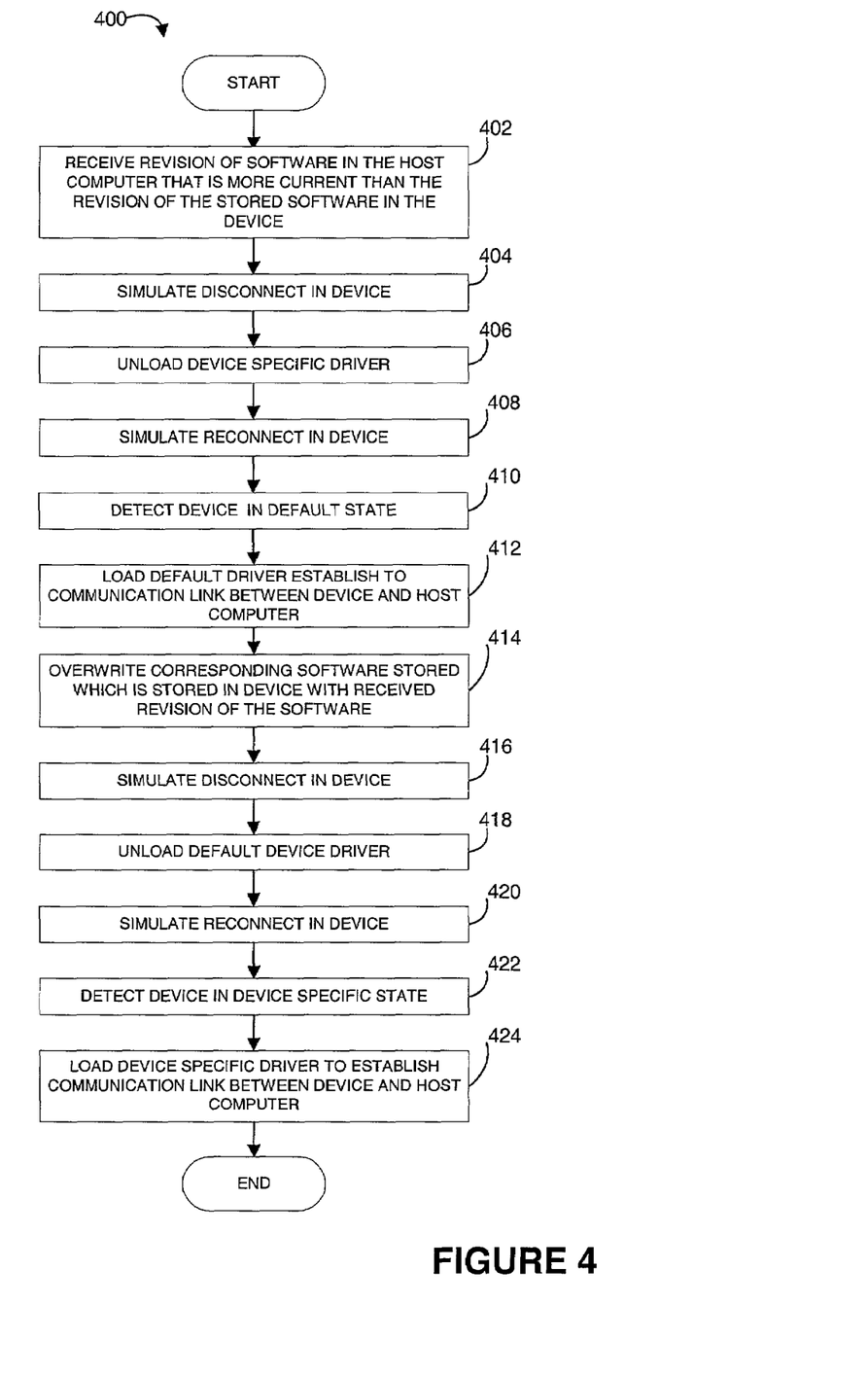
FIG. 4 describes one embodiment of a method of updating firmware on the device.

FIG. 4 describes one embodiment of a method of updating firmware on the device. Similar to the process described in FIG. 3B, FIG. 4 describes a method of automatically updating software components that are also stored in the memory system of the device. The software components can include firmware. The firmware includes the operating software and/or data for the device. Occasionally, a manufacturer will issue firmware updates to correct software errors and to enable additional device features. An updated operating system can make the device more flexible and more useful and extend the usable lifetime of the device. In devices that include both a default mode or default state, and a device-specific state, such as to be enabled to transport or deliver the device-specific driver as described in FIG. 2B above, then, the device includes at least two portions of firmware. One portion of the firmware is the default state firmware. Another portion of the firmware is the device-specific firmware. The process described in FIG. 4 can update either the device-specific firmware or the device-specific driver, which are stored in the device memory system.

In block 402 of FIG. 4, a revision of the software is received in the host computer. In this example, the received revision is more current than the version of the stored software in the device. Because the received revision is more current than the version stored in the device, a software update process is initiated. In response to the software update initiation, in block 404, the device simulates a disconnect. In block 406, the host unloads the device-specific driver. In block 408, the device simulates a reconnect in the default state, and the host therefore detects the device in the default state in block 410. The host computer loads the default driver in block 412, which establishes a default communication link between the device and the host computer. The software that corresponds to the software revision that was received in block 402, is overwritten in the memory system of the device in block 414. In one embodiment, the corresponding software may be the device-specific firmware or the device-specific driver.

In block 416, a disconnect is simulated in the device. The simulated disconnect causes the host computer to unload the default driver in block 418. The device switches to a device-specific state and simulates a reconnect in block 420. In block 422, the host detects the device in the device-specific state. In block 424, the device-specific driver is loaded to establish a device-specific communication link between the device and the host computer.

Figure 5A:
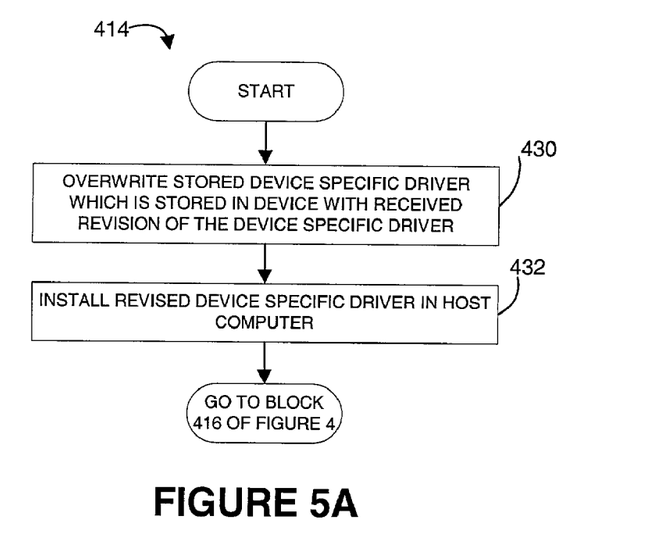
FIGS. 5A and 5B illustrate alternative embodiments of the process of block 414 of FIG. 4, as may be required for the different types of software being updated.
Figure 5B:
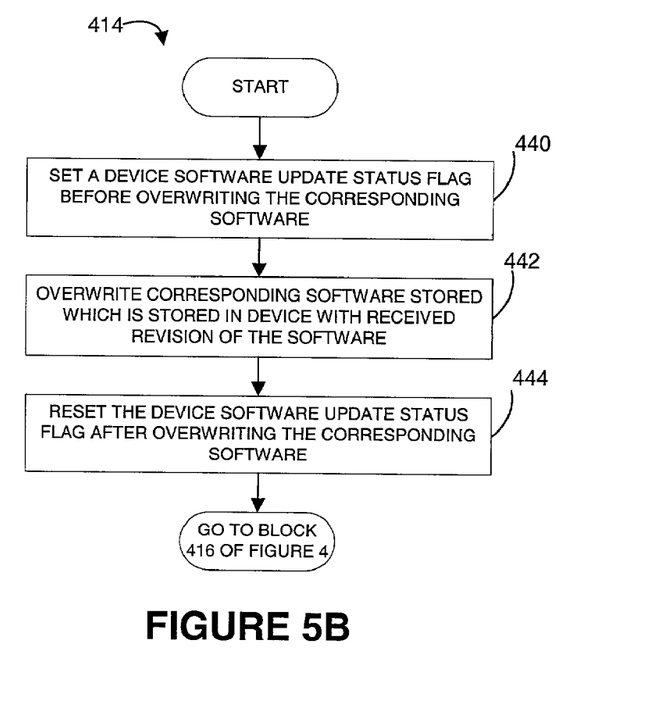

FIGS. 5A and 5B illustrate alternative embodiments of the process of block 414 of FIG. 4, as may be required for the different types of software being updated, i.e., the device-specific operating system or the device-specific driver. In FIG. 5A, in block 430, if the software that is received is a device-specific driver, then in block 430 the stored device-specific driver is overwritten with the received revision of the device-specific driver. In block 432, the device-specific driver is installed in the host computer. The process then continues at block 416 of FIG. 4.

Figure 7:
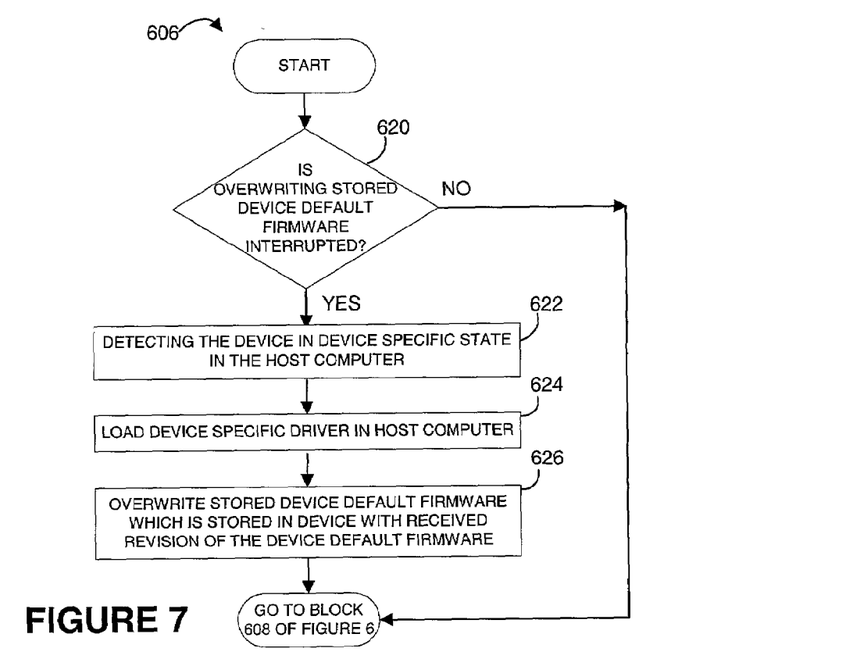
FIG. 7 illustrates one embodiment of a recovery process if overwriting the device default firmware was interrupted.

FIG. 5B illustrates an alternative embodiment for performing the software update. FIG. 5B adds a software "safety" check to ensure that if the software update in the memory system of the device is interrupted, then the software update can be repeated, even though a portion of the software stored in the device memory may be corrupted. In block 440, a device software update flag is set before the software is overwritten. In block 442, the corresponding software is overwritten into the device memory system with the received revision of the software. In block 444, the device software update status flag is reset after the software is fully overwritten in the device memory system. If the software overwrite was interrupted, such as if the device was disconnected or power was interrupted, then the software will be completely re-overwritten by whatever the new software is that is stored in the host computer. FIG. 7, described below, is a similar process of recovering from an interrupted software update process.

Figure 6:
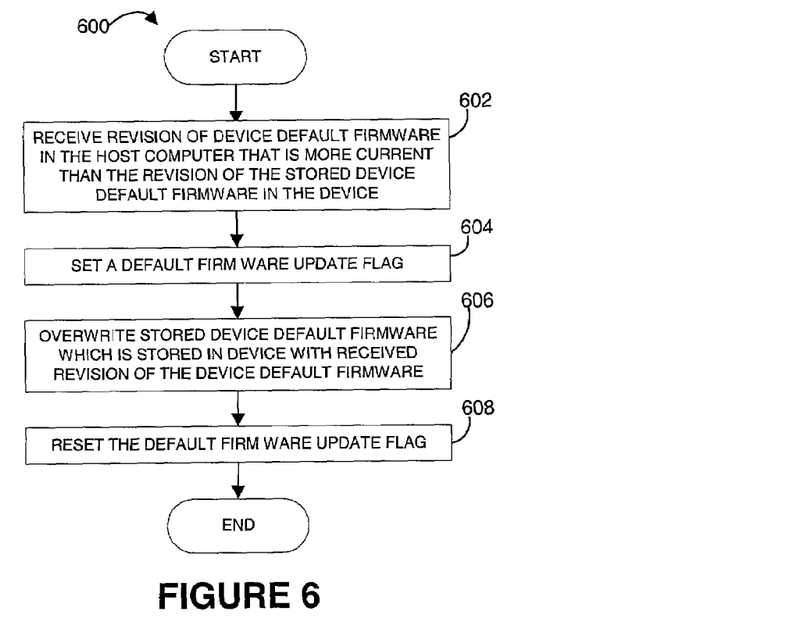
FIG. 6 illustrates one embodiment of updating the default firmware in the device when the device is already communicating through the device-specific driver with the host computer.

When the device is installed and operating and communicating with the host computer using the device-specific driver, then the default software portion of the device such as the default firmware, can be updated because the default firmware is not being used. FIG. 6 illustrates one embodiment of updating the default firmware in the device when the device is already communicating through the device-specific driver with the host computer, i.e., in normal operation. In block 602, a revision of the default firmware is received in the host computer. The received revision of the default firmware is more current than the revision that is currently stored in the device and a default firmware update is initiated. In block 604, a default firmware update flag is set. The default firmware update flag is similar to the device software update flag set in block 440 of FIG. 5B. In block 606, the stored default firmware is overwritten with the received revision of the default firmware. In block 608, the default firmware update flag is reset. The default firmware update flags are provided to ensure that if the default update process is interrupted, then the default firmware will be completely overwritten.

FIG. 7 illustrates one embodiment of a recovery process if overwriting the device default firmware was interrupted. In block 620, the device software update flag is interrogated such as during an initial power-up of the device. If the device software update flag is not set, then the process continues in block 608 of FIG. 6. If the device software update flag is set, then the device switches to the device-specific state and the host computer detects the device in the device-specific state. The device-specific driver is then loaded in the host computer in block 624. In block 626, the default firmware is fully overwritten. The process continues in block 608 of FIG. 6 where the default firmware update flag is reset.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Figure 8:
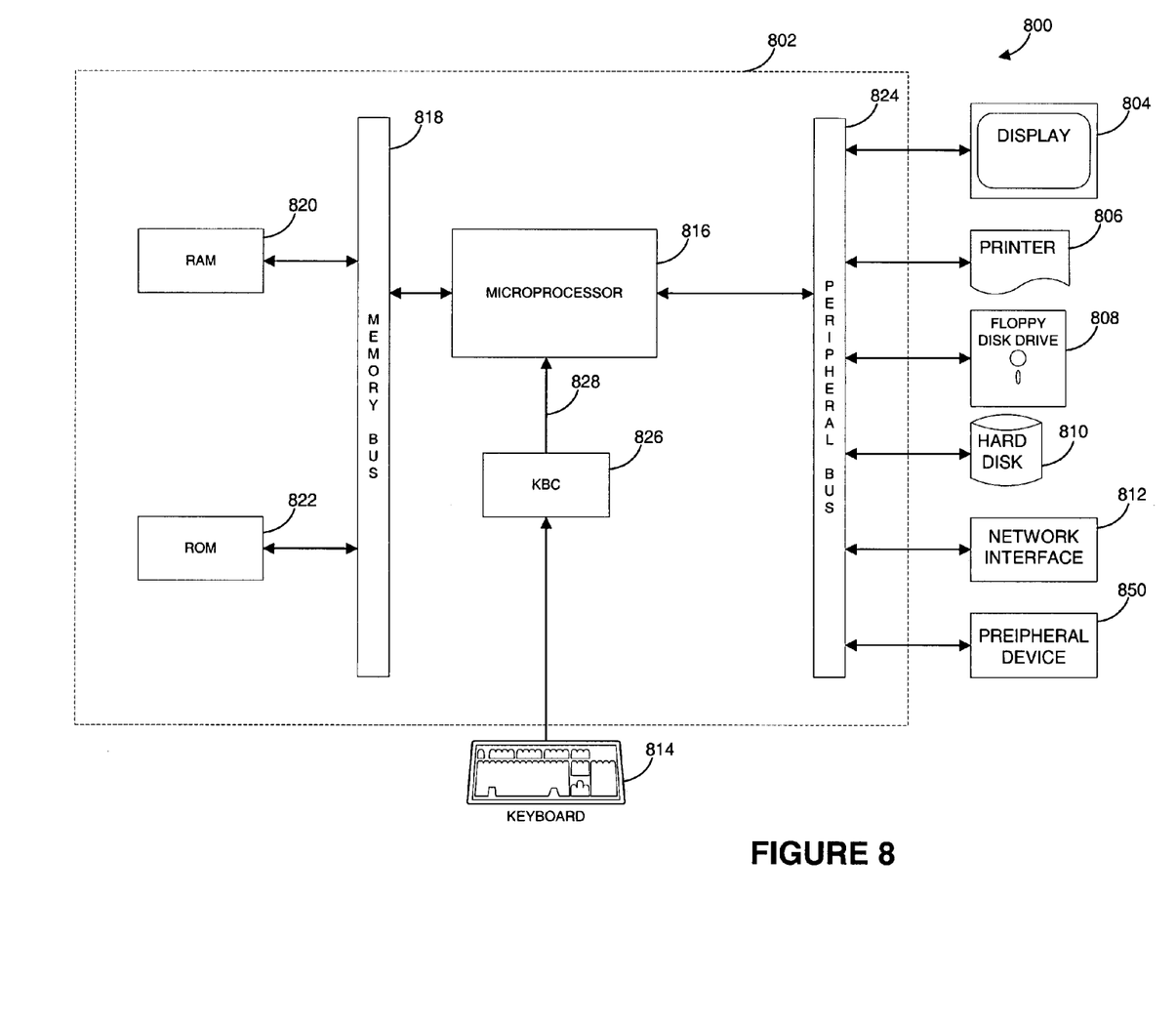
FIG. 8 is a block diagram of an exemplary computer system.

FIG. 8 is a block diagram of an exemplary computer system 800 for carrying out the processing according to the invention. The computer system 800 includes a digital computer 802, a display screen (or monitor) 804, a printer 806, a floppy disk drive 808, a hard disk drive 810, a network interface 812, a peripheral device 850 and a keyboard 814. The digital computer 802 includes a microprocessor 816, a memory bus 818, random access memory (RAM) 820, read only memory (ROM) 822, a peripheral bus 824, and a keyboard controller (KBC) 826. The digital computer 802 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 816 is a general-purpose digital processor, which controls the operation of the computer system 800. The microprocessor 816 can be a single-chip processor or can be implemented with multiple components. Using instructions retrieved from memory, the microprocessor 816 controls the reception and manipulation of input data and the output and display of data on output devices.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the digital computer 802. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806, when operating as a printer, provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operate to execute computer code and produce and use data. The computer code and data may reside on the RAM 820, the ROM 822, or the hard disk drive 810. The computer code and data could also reside on a removable program medium and loaded or installed onto the computer system 800 when needed. Removable program media include, for example, CD-ROM, PC-CARD, floppy disk and magnetic tape.

The network interface 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general-purpose computer.

Figure 9:
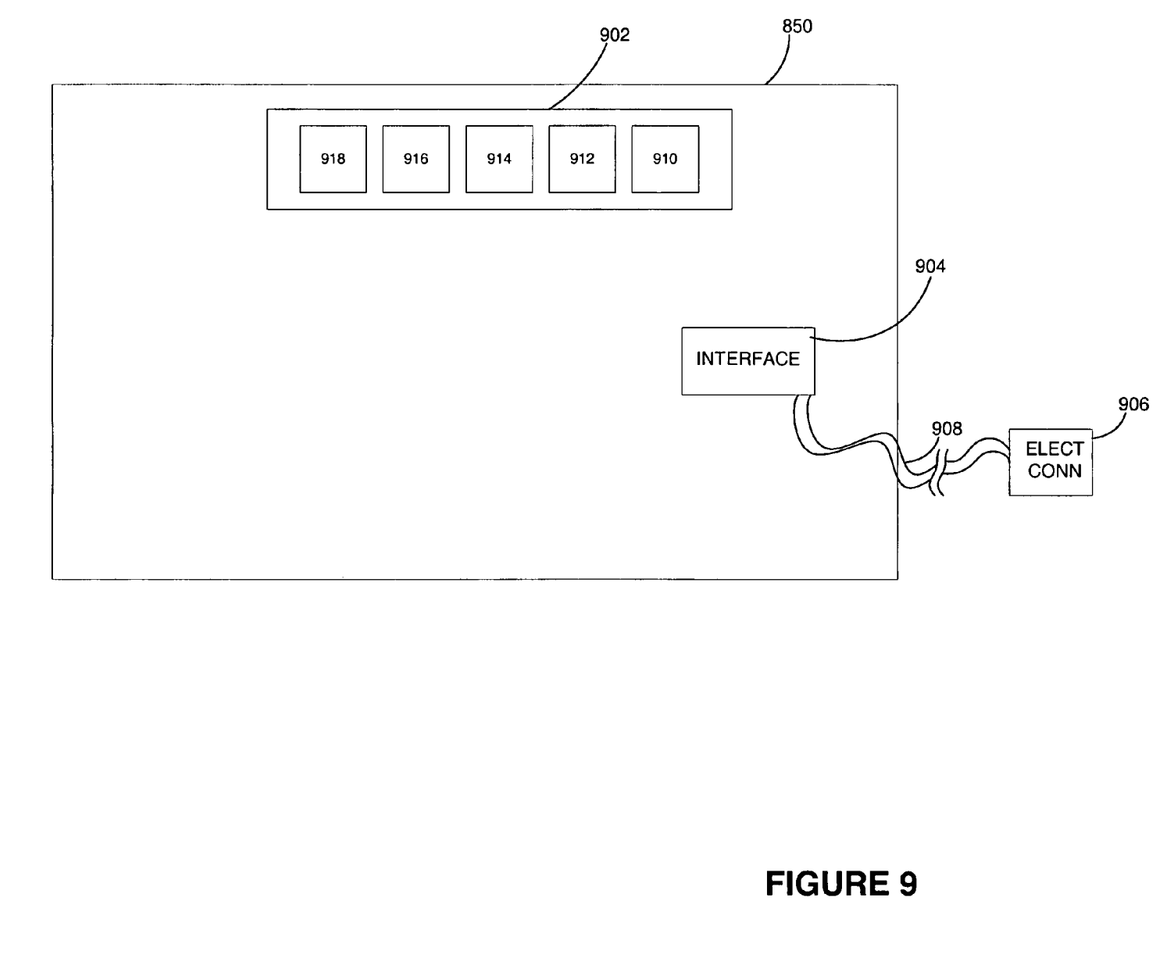
FIG. 9 illustrates additional details of one embodiment of the peripheral device.

The peripheral device 850 can be any device such as a USB device or other plug-and-play devices. FIG. 9 illustrates additional details of one embodiment of the peripheral device 850. The peripheral device 850 can be an internally mounted peripheral device such as an interface card, a video controller, a hard drive or other internally mounted peripheral device. The peripheral device 850 can also be an external device such as an external optical drive or a digital camera, a printer, a monitor, or any other type of externally mounted peripheral device. The peripheral device 850 includes a memory system 902 and an interface 904. The interface 904 couples the device 850 to the computer 802 via an electrical cable 908 and interface specific electrical connector 906, which is coupled to the peripheral bus 824. The electrical connector 904 can also be a card edge connector and the connector electrical cable 908 can be a printed circuit on in the peripheral device 850. The interface 904 can also be a wireless interface such as an infrared, a Bluetooth, or other wireless interconnect interfaces. The interface 904 can be any type of interface such as USB, PCMICA, PCI, Firewire, Cardbus, mini PCI and other interfaces. The memory system 902 can include several portions 910, 912, 914, 916, 918. Each of the portions 910, 912, 914, 916, 918 can, in various embodiments, be read-only memory (ROM) or re-writeable memory such as EEPROM, flash, or any other suitable non-volatile memory type. The device-specific driver is stored in the memory system 902. The device-specific and default firmware are also stored in the memory system 902. The memory system 902 can also include other software and data stored therein.

It will be further appreciated that the procedures represented by the blocks in FIGS. 2A–7 are not required to be performed in the order illustrated, and that all the processing represented by the blocks may not be necessary to practice the invention. Further, the processes described in FIGS. 2A–7 can also be implemented in software stored in any one of or combinations of the RAM 820, the ROM 822, or the hard disk drive 810.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of connecting a device to a host computer comprising;

detecting a connection of a device in a host computer;

loading a default driver, wherein the default driver establishes a default communication link between the device and the host computer, the device being a member of a family of devices, the family of devices including a plurality of devices, the default communication link capable of providing limited communication between each member of the family of devices and the host computer, wherein the default communication link provides access to only a first plurality of functions of the device, the first plurality of functions being compatible with the family of devices;

identifying the device; and loading a device-specific driver on the host computer, wherein the device-specific driver is stored in a device memory, wherein the device-specific driver corresponds to the identified device, wherein the device specific driver establishes a device-specific communication link between the device and the host computer and wherein the device-specific communication link provides access to a plurality of device-specific functions including the first plurality of functions of the device and wherein loading the device specific driver includes:

unloading the default driver in the host computer; and detecting the device in a device-specific state in the host computer, wherein the device specific state includes access to the plurality of device-specific functions.

2. The method of claim 1, wherein identifying the device includes:

determining if the device-specific driver is installed on the host computer.

3. The method of claim 2, wherein if the device-specific driver is not installed on the host computer, then: installing the device-specific driver.

4. The method of claim 1, wherein detecting the connection of the device in the host computer includes detecting the device is in a default state.

5. The method of claim 1, wherein the device includes a plug and play (PNP) device.

6. The method of claim 5, wherein the PNP device includes at least one of a group consisting of a USB device, a Firewire device, an PCMCIA device, a Cardbus device, a PCI device and a mini PCI device.

7. The method of claim 1, wherein the default driver has been installed before the device is connected to the host computer.

8. The method of claim 1, wherein the default driver is compatible with a plurality of different devices.

9. A computer system comprising:
   a processor;
   a peripheral device, wherein the peripheral device is coupled to the processor by a first bus, and wherein the peripheral device includes a peripheral device memory system;
   a computer memory system, coupled to the processor, wherein the computer memory system includes instructions executable by the processor to:
      detect a connection of a device in a host computer;
      load a default driver, wherein the default driver establishes a default communication link between the device and the host computer, the device being a member of a family of devices, the family of devices including a plurality of devices, the default communication link capable of providing limited communication between each member of the family of devices and the host computer, wherein the default communication link provides access to a first plurality of functions of the device, the first plurality of functions being compatible with the family devices;
      identify the device; and
      load a device-specific driver on the host computer, wherein the device specific driver establishes a device-specific communication link between the device and the host computer and wherein the device-specific communication link provides access to a plurality of device-specific functions including the first plurality of functions of the device, wherein the device-specific driver is stored in a device memory, wherein the device-specific driver corresponds to the identified device, and wherein loading the device specific driver includes:
         unloading the default driver in the host computer; and
         detecting the device in a device-specific state in the host computer, wherein the device specific state includes access to the plurality of device-specific functions.

10. A peripheral device comprising:
    an interface, wherein the interface couples signals from the peripheral device and a host computer system in a default state if a device-specific driver is not installed on the host computer system, wherein the default state enables a default driver, the device being a member of a family of devices, the family of devices including a plurality of devices, the default communication link capable of providing limited communication between each member of the family of devices and the host computer, the default state provides access to a first plurality of functions of the device, the first plurality of functions being compatible with the family of devices, and in a device-specific state if the device-specific driver is installed on the host computer system, wherein the device specific state includes establishing a device-specific communication link between the device and the host computer system and wherein the device-specific communication link provides access to a plurality of device-specific functions including the first plurality of functions of the device;
    a peripheral device memory, wherein the peripheral device memory includes the device-specific driver stored, thereon, wherein the device-specific driver corresponds to the peripheral device, wherein the stored device-specific driver can be accessed by the host computer system, wherein at least a portion of the peripheral device memory is re-writeable memory, wherein the device-specific driver can be overwritten by at least one of the peripheral device or the host computer system.

* * * * *